United States Patent

[11] 3,572,863

[72] Inventor Walter S. Josephson
 Skippack, Pa.
[21] Appl. No. 693,195
[22] Filed Dec. 26, 1967
[45] Patented Mar. 30, 1971
[73] Assignee Greene Tweed & Co. Inc.

[54] ASBESTOS-BASE WEAR RING
 5 Claims, 3 Drawing Figs.
[52] U.S. Cl. .................................................. 308/238,
 161/144, 161/170, 252/12.4
[51] Int. Cl. ................................................... B32b 19/02,
 F16c 9/00, F16c 33/20
[50] Field of Search............................................ 161/144,
 170; 252/12, 12.4; 264/108; 260/845; 308/35,
 238, 240

[56] References Cited
 UNITED STATES PATENTS
1,877,651 9/1932 Eisenhardt .................. 264/108
2,326,000 8/1943 Teeple......................... 252/12.4
2,473,319 6/1949 Winkelmann ............... 260/845
2,605,248 7/1952 Fisk............................. 260/845
2,910,449 10/1959 Evans.......................... 260/845
3,271,308 9/1966 Veit et al. .................... 252/12.4
3,455,864 7/1969 Dodson et al................ 252/12.4

OTHER REFERENCES
Goss - New Rubber Phenolic Materials for Greater Impact Strength General Electric Bulletin - April 30, 1951 (Reprinted from PRODUCT ENGINEERING - Jan. 1951) pages 1— 5

Primary Examiner—Robert F. Burnett
Assistant Examiner—Stephen M. Hoffman
Attorney—Seidel and Gonda ABSTRACT: A bearing formed of asbestos fibers, phenol-formaldehyde resin, nitrile rubber and lubricant. Such bearing is made by forming a preform of the components, and then molding the preform to the desired shape.

PATENTED MAR 30 1971
3,572,863
FIG. 1
FIG. 2
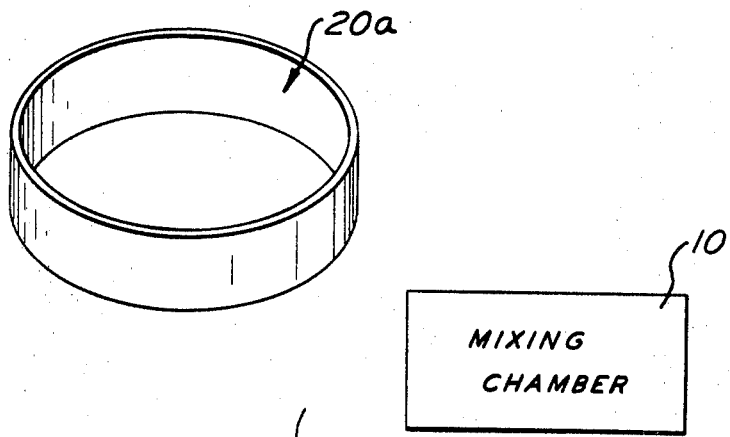
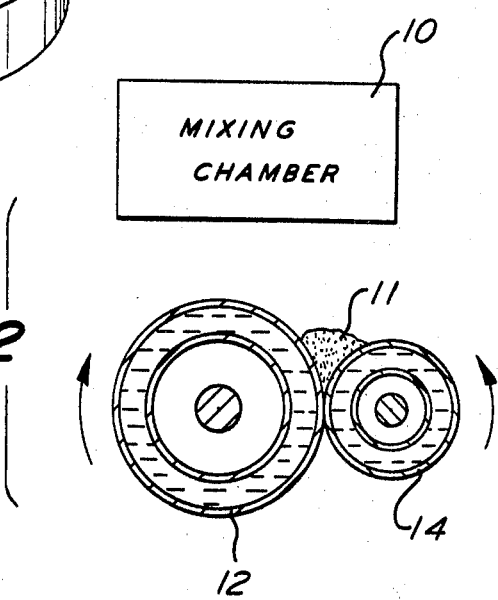
FIG. 3
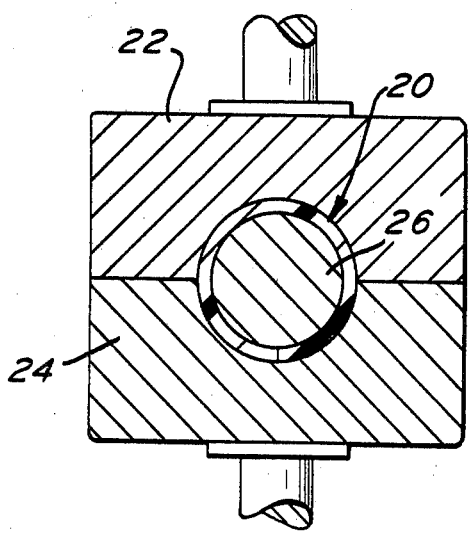
INVENTOR
WALTER S. JOSEPHSON
BY  Seidel & Gonda
ATTORNEYS.

ASBESTOS-BASE WEAR RING

This invention is directed to an asbestos-base bearing and a method for forming the same.

Bearings in the form of wear rings made of cotton duck whose surface has been impregnated with a phenol-formaldehyde resin and a solid lubricant, such as Teflon or graphite, have been widely used. In particular, such wear rings have been used for reciprocating piston and rod applications to eliminate metal-to-metal contact of moving parts, prevent galling, scoring, and resulting wear and fluid contamination.

Unfortunately, these bearings formed from impregnated cotton duck suffer from the relatively poor heat resistant properties of the cotton duck. Thus, while the woven structure of the cotton duck facilitates its impregnation and its functioning as a skeletal structure, the cotton duck tends to lose its physical properties at elevated temperatures.

This invention has as an object the provision of a novel asbestos-base bearing which has superior heat resistance properties.

This invention has as another object the provision of an asbestos-base bearing in which the asbestos fibers are substantially longitudinally oriented.

This invention has as another object the provision of a method of forming asbestos-base bearings.

Other objects will appear hereinafter.

Referring to the drawings wherein like reference characters refer to like parts:

FIG. 1 is a perspective of an asbestos-base bearing or wear ring of the present invention.

FIG. 2 is a side elevational view illustrating the process whereby the preform used to make the asbestos-base bearing of the present invention is made.

FIG. 3 is a sectional view illustrating the molding of the preform produced by the process shown in FIG. 2 into an asbestos-base bearing.

The asbestos-base bearings of the present invention comprise a mixture of phenol-formaldehyde resin, nitrile rubber which is compatible with the phenol-formaldehyde resin, asbestos fibers, and preferably also a solid lubricant, such as Teflon or graphite. Preferably, the asbestos fibers are substantially oriented so that they extend longitudinally in respect to the longitudinal dimension of the bearing.

The asbestos-base bearings of the present invention consist essentially of between about 50 to 75 weight percent of asbestos, about 15 to 25 weight percent of phenol-formaldehyde resin, about 10 to 20 weight percent of a nitrile rubber which is compatible with the phenol-formaldehyde resin, and between 10 to 20 weight percent of a solid lubricant, such as Teflon or graphite, if a lubricant is present.

The process of the present invention comprises forming a preform as an extruded sheet of the aforesaid components, and then molding the preform to the finished asbestos-base bearing. In particular, the asbestos fibers and solid lubricant are blended in a solution of the phenol-formaldehyde resin and the nitrile rubber (plus a curing agent for the nitrile rubber) to form a homogenous mixture. The homogenous mixture is then compressed and extruded by rollers with sufficient heat being added through at least one of the rollers to partially cure the nitrile rubber and to drive off the solvent for the phenol-formaldehyde resin and the nitrile rubber. During the conversion of the homogenous mixture into sheet form, the asbestos fibers are substantially oriented longitudinally in respect to the sheet. The sheet is then cut into a preform, and the preform is molded into the asbestos-base bearing of the present invention.

The preform used in the process of the present invention should be substantially in the shape of the finished asbestos-base bearing, so that the amount of forming in the mold is minimized. Thus, it is difficult to obtain satisfactory molding if there is a substantial amount of loose material in the mold cavity, or if there is a substantial amount of forming to be performed in the mold cavity.

A wide variety of asbestos fibers may be used to form the asbestos-base bearings of the present invention. I have obtained particularly good results with the Canadian Government Classification Grade 4, medium length asbestos fibers. However, somewhat longer or somewhat shorter fibers can be used, as for example, Canadian Government Classification Grades 3 and 5. Moreover, the present invention contemplates the use of mixtures of different size asbestos fibers.

A suitable phenol-formaldehyde thermoset resin useful for the asbestos-base bearings of the present invention, and which may be deemed to be illustrative, is one having the following specifications:

| | |
|---|---|
| Melting point (capillary), °C | 60–75 |
| Stroke cure at 150° C., sec | 20–50 |
| Plate flow at 125° C., mm | 40–90 |
| Screen size: | |
|   Percent thru 200 mesh (minimum) | 99 |
|   Percent thru 325 mesh (minimum) | 95 |

A suitable nitrile rubber which is compatible with the aforesaid phenol-formaldehyde resin is a nitrile rubber (NBR) copolymer of butadiene and acrylonitrile having an average Mooney viscosity of 80.

The nitrile rubbers (sometimes referred to as NBR polymers) are substantially copolymers of butadiene and acrylonitrile, although small amounts of a third monomer may be incorporated to impart special properties.

The phenol-formaldehyde resin and the nitrile rubber must be compatible with each other. Moreover, the phenol-formaldehyde resin and the nitrile rubber both must be soluble in a common solvent, which solvent must be relatively volatile, so that it can be driven off by the application of heat.

In the process of the present invention, the nitrile rubber is dissolved in its noncured state, and subsequently partially cured at the time the solvent is driven off.

The solid lubricant is generally either Teflon or graphite. The solid lubricant should be finely divided, preferably sufficiently fine so that 90 percent passes through a screen of 60 mesh.

Referring to the drawings, the components of the asbestos-base bearing of the present invention are blended together in the mixing chamber 10. Preferably, the noncured nitrile rubber and the phenol-formaldehyde resin are dissolved in the solvent, such as methyl ethyl ketone, acetone, or other suitable solvent. Then the asbestos fibers and the solid lubricant are added together with a sufficient amount of sulfur so that partial curing of the nitrile rubber will be effected at a temperature of 200—250°F. The whole mixture is blended and kneaded until the mixture assumes the consistency of a doughlike mass. In some embodiments, the solid lubricant may be omitted.

The doughlike mixture is then transferred as the preform mix 11 from the mixing chamber 10 onto a standard Asbestos Sheeter. The Sheeter has a relatively large diameter heated jacketed roller 12, which can be heated to a temperature on the order of 200 to 250° F. The cooled roller 14 is preferably cooled with available running water, such as to 40—80° F.

The heated surface of the roller 12 drives off the solvent from preform mix 11. Such solvent can be recovered by suitable solvent recovery means (not shown). The heat from heated roller 12 effects partial curing of the nitrile rubber, so that it serves as a binder. The heat from heated roller 12 should not be so great as to set the phenol-formaldehyde resin, nor to cure the nitrile rubber to the ebonite state. Thus, the temperature of the preform mix should not attain 250° F. as most phenol-formaldehyde resins commence curing at about 250° F. to 280° F. A normal average temperature range for the preform mix 11 is at least 10° to 20° F. below the temperature of the heated roller 12.

The Sheeter is operated in a conventional manner. Thus, the rollers 12 and 14 are initially held very close together so that the preform mix on the rollers is worked under heat and pressure. As the solvent is driven off, the cooled roller 14 is moved away from the heated roller 12 to permit a build up of the sheet having a thickness of the order of about one sixty-fourth to one-fourth inch.

The resultant sheet can then be slit by existing sheet slitting machines, such as the sheet slitting machine disclosed in Tanis Pat. No. 2,777,521.

The compression of the preform mix 11 between the rollers 12 and 14 effects an alignment of a substantial portion of the asbestos fibers within the preform mix 11, whereby such asbestos fibers become longitudinally aligned, with their length dimensions running substantially in the direction of movement of the preform mix 11.

The slit compressed sheet material may be rolled into a circular preform if a ring-shaped asbestos-base bearing, such as shown in FIG. 1, is desired.

This circular preform is then molded under heat and pressure to set the phenol-formaldehyde resin and further cure the nitrile rubber. In FIG. 3, preform 20 is molded between mold members 22 and 24 while held around mandrel 26 to produce the final asbestos-base bearing designated 20a in FIG. 1.

The characteristics of the phenol-formaldehyde resin predominate in the finished asbestos-base bearing, but the nitrile rubber serves as a plasticizer and processing binder. Moreover, the rubber increases the impact strength of the finished asbestos-base bearing.

While the drawings illustrate the production of a circular bearing, it is to be understood that the process of the present invention can be used to form bearings of other shapes.

I have found that the process of the present invention in which a preform is made by the application of pressure to the preform mix in the manner indicated produces a very dense, strong material, far stronger than could be produced by the direct molding of the material from the mixing chamber 10.

The degree of the postcuring of the nitrile rubber should be controlled so that the rubber is preferably not postcured to the ebonite stage. Thus, I have found that this drastic form of postcuring results in adverse dimensional changes in the asbestos-base bearing. The set phenol-formaldehyde resin confers upon the bearing its necessary hardness and resistance to deformation. However, in applications where a very hard bearing is needed, the nitrile rubber may be postcured to the ebonite state.

The means by which the nitrile rubber is cured, namely the amount of sulfur and the curing temperature form no part of the present invention, since such means are well-known to those having ordinary skill in the art, and any desired degree of cure can be obtained by those having skill in rubber technology.

In order to illustrate a particular formulation used to form an asbestos-base bearing of the present invention, I have successfully employed the following formulation:

| Component: | Parts by weight |
| --- | --- |
| Nitrile rubber (NBR) | 100.00 |
| Phenol-formaldehyde | 150.00 |
| Sulfur | 1.50 |
| Stearic acid | 1.00 |
| Benzothiazyl disulfide | 1.50 |
| Powdered graphite | 75.00 |
| Asbestos Fibre | 400.00 |

The bearings of the present invention have excellent heat resistance and dimensional stability. Thus, their coefficient of expansion under high temperature conditions is relatively low.

The bearings of the present invention can be used as a substrate or support component. Thus, by way of example, they can be used in conjunction with a liner, such as Teflon liner, which may be adhesively bonded to the bearing of the present invention. Alternatively, the bearings of the present invention may be coated with a solid lubricant, such as Teflon.

Preferably, as above-indicated, there is a partial curing of the nitrile rubber on the heated roller 12, with the remaining amount of the curing of the rubber occurring in the mold. The temperature of the heated roller 12 should be such that the phenol-formaldehyde resin portion of the preform mix does not set on the heated roller 12, but rather, the phenol-formaldehyde resin portion of the asbestos-base bearing sets during the final molding stage. One having ordinary skill in the art can readily determine the appropriate temperatures for the heated roller 12 and the mold members 22 and 24 for any given phenol-formaldehyde resin.

The preferred range of thickness of the compressed preform material coming from the nip of rollers 12 and 14 is of the order of one sixty-fourth to one-fourth inch thickness. However, somewhat thinner and somewhat thicker thicknesses can be used.

I have tested the asbestos-base bearings formed pursuant to the subject invention under conditions of high load. For example, with an asbestos-base bearing formed from the specific composition set forth above, a 5000 pound per square inch load gave only a 5 percent to 6 percent compression, with no noticeable flow of rubber.

The asbestos-base bearings produced by the present invention have prime utility in applications where lubrication is difficult, or not possible. In these applications, the bearing wears sacrificially, rather than metal.

The subject bearings are far lower in cost to produce than either nylon bushings or bronze bushings in comparable sizes. Moreover, unlike bronze bushings, the bearings of the present invention can function in the absence of lubrication.

The amount of the solid lubricant, and the size of solid lubricant particles can be regulated depending upon the usage to which the bearings are put. For example, with graphite, as a general rule it is advisable to decrease the amount of asbestos fibers in proportion to the increase of the graphite particles, although the relationship need not be a one for one ratio. The preference of one form of solid lubricant over another in a specific situation is a matter falling within the skill of one having ordinary skill in the art.

The present invention may be embodied in other specific forms without departing from the spirit or essential attributes thereof and, accordingly, reference should be made to the appended claims, rather than to the foregoing specification as indicating the scope of the invention.

I claim:

1. An annular-shaped asbestos-base wear ring to be used for reciprocating piston and rod applications to eliminate metal-to-metal contact of moving parts with the avoidance of galling, scoring, and resulting wear and fluid contamination consisting essentially of 50 to 75 weight percent asbestos fibers, 15 to 25 weight percent of thermosettable phenol-formaldehyde resin, and 10 to 20 weight percent of nitrile rubber which is compatible with said phenol-formaldehyde resin.

2. An annular-shaped asbestos-base wear ring in accordance with claim 1 having 10 to 20 weight percent of a solid lubricant.

3. An annular-shaped asbestos-base wear ring in accordance with claim 1 in which the asbestos fibers are substantially longitudinally oriented in respect to the longitudinal dimension of the bearing.

4. An annular-shaped asbestos-base wear ring to be used for reciprocating piston and rod applications to eliminate metal-to-metal contact with moving parts with the avoidance of galling, scoring, and resulting wear and fluid contamination consisting essentially of 50 to 75 weight percent asbestos fibers, with the asbestos fibers being substantially longitudinally oriented in respect to the longitudinal dimension of the bearing, 15 to 25 weight percent of thermosettable phenol-formaldehyde resin, 10 to 20 weight percent of nitrile rubber which is compatible with said phenol-formaldehyde resin, and 10 to 20 weight percent of a solid lubricant.

5. An annular-shaped asbestos-base wear ring to be used for reciprocating piston and rod applications to eliminate metal-to-metal contact of moving parts with the avoidance of galling, scoring, and resulting wear and fluid contamination consisting essentially of 50 to 75 weight percent asbestos fibers, 15 to 25 weight percent of thermosettable phenol-formaldehyde resin, and 10 to 20 weight percent of partially cured nitrile rubber which is compatible with the phenol-formaldehyde resin, said partially cured nitrile rubber being cured to a state below the ebonite state.